United States Patent
Nishimoto et al.

(10) Patent No.: US 8,870,258 B2
(45) Date of Patent: Oct. 28, 2014

(54) OPENING SEAL FOR AUTOMOBILES AND METHOD OF PREPARING THE SAME

(75) Inventors: Yoshitaka Nishimoto, Hiroshima (JP); Shinji Nishikawa, Hiroshima (JP); Brian McCabe, Topeka, IN (US)

(73) Assignee: Nishikawa Rubber Co., Ltd., Hiroshima-Shi, Hiroshima-Ken (JP)

( * ) Notice: Subject to any disclaimer, the term of this patent is extended or adjusted under 35 U.S.C. 154(b) by 232 days.

(21) Appl. No.: 13/364,552

(22) Filed: Feb. 2, 2012

(65) Prior Publication Data
US 2012/0223542 A1 Sep. 6, 2012

(30) Foreign Application Priority Data

Mar. 1, 2011 (JP) ................................. 2011-043851

(51) Int. Cl.
*B60J 10/08* (2006.01)
*B60J 10/00* (2006.01)

(52) U.S. Cl.
CPC .......... *B60J 10/0011* (2013.01); *B60J 10/0031* (2013.01); *B60J 10/0065* (2013.01); *B60J 10/081* (2013.01); *Y10S 277/921* (2013.01)
USPC ............................................ 296/93; 277/921

(58) Field of Classification Search
CPC ............... B60J 10/0005; B60J 10/0011; B60J 10/0022; B60J 10/0065; B60J 10/081; B60J 10/083
USPC .............. 296/93, 146.2, 146.9, 206; 277/921; 49/475.1, 438, 40, 500.1
See application file for complete search history.

(56) References Cited

U.S. PATENT DOCUMENTS 4,413,033 A * 11/1983 Weichman ..................... 428/122
5,009,947 A * 4/1991 McManus et al. ............. 428/122

(Continued)

FOREIGN PATENT DOCUMENTS

| EP | 0045176 A2 | 2/1982 |
| EP | 0 836 961 A1 | 4/1998 |

(Continued)

OTHER PUBLICATIONS

Communication (Extended European Search Report) dated Jun. 1, 2012 issued by the European Patent Office in related European Patent Application No. 12156642.6 (5 pages).

*Primary Examiner* — Jason S Morrow
*Assistant Examiner* — E Turner Hicks
(74) *Attorney, Agent, or Firm* — Robert P. Michal; Lucas & Mercanti LLP

(57) ABSTRACT

In a wire core 20 embedded in an opening seal for automobiles, a non-thermo-fusible yarn 221 on the outer-cabin side is provided in a range 401 from a bending start position 21c forming a shoulder 21a on the outer-cabin side of a wire body 21 which is bent roughly in U-shape to a position 52 determined by offsetting a point 51 on a door internal circumference side of a base 12a of a hollow seal member 12 on the inner side whereas a non-thermo-fusible yarn 222 on the inner-cabin side is provided in a range 501 from a bending start position 21e forming a shoulder 21b on the inner-cabin side of the wire body 21 to a position 54 determined by offsetting a point 53 on an opening edge side on an inner-cabin side wall 11b of a base of a protuberance 13 with respect to the wire body 21.

7 Claims, 8 Drawing Sheets

(56) References Cited

U.S. PATENT DOCUMENTS 6,761,954 B2 * 7/2004 Hauser .................. 428/108
2007/0028987 A1 * 2/2007 Whitehead ............... 139/55.1

FOREIGN PATENT DOCUMENTS

JP         03-082519       4/1991
JP       2004-322768    11/2004

* cited by examiner

OPENING SEAL FOR AUTOMOBILES AND METHOD OF PREPARING THE SAME

CROSS-REFERENCE TO RELATED APPLICATION

This application claims the benefit under 35 USC 119 of JP Patent Application JP 2011-043851 filed Mar. 1, 2011, the entire disclosure of which is incorporated herein by reference.

BACKGROUND OF THE INVENTION

The present invention relates to opening seals for automobiles and method of preparing the same having wire core embedded in installation base members thereof for increasing rigidity, which are installed along peripheries of door opening parts of automobile bodies for sealing openings between bodies and doors by making elastic contact with the doors when the doors are closed.

As shown in FIG. 8 and FIG. 9, an opening seal 10 for automobiles having a wire core 20 embedded therein has been well-known, which is mounted on a flange 3 installed along a periphery of a door 2 opening part on an automobile body 1 side for making elastic contact with the door 2 when the door 2 is closed to seal an opening between the body 1 and the door 2 (see, for example, the Japanese unexamined Patent Publication Nos. H03-82519 and 2004-322768).

FIG. 8 is a side view of an automobile having the opening seal 10 for automobiles mounted thereon; and FIG. 9 is an enlarged perspective view of an important, part of 100 of FIG. 8, showing the opening seal 10 for automobiles.

The opening seal 10 for automobiles comprises: a cross section roughly U-shaped installation base member 11 including an outer-cabin side wall 11a, an inner-cabin side wall 11b and a connecting wall 11c which connects the side the installation base member 11; and a protuberance 13 provided inside the inner-cabin side wall 11b of the installation base member 11, which makes elastic contact with and holds the flange 3. The outer-cabin side wall 11a has a plurality of projections 14 provided inside, which make elastic contact with the flange 3; and the installation base member 11 has a lip 15 provided on an inner-cabin side thereof. Decorative coating material 16 is provided from the lip 15 to a surface of the connecting wall 11c of the installation base member 11 for decorating appearance from an inner-cabin side.

As shown in FIG. 10 and FIG. 11, the wire core 20 embedded in the installation base member 11 of the opening seal 10 for automobiles comprises: a skeletal wire body 21 formed by consecutively bending a wire; and yarns 22, 23 partially connected with the wire body 21 for preventing expansion of the wire body 21 in a longitudinal direction. The wire core 20 is finally embedded in a longitudinal direction of the installation base member 11 while the wire core 20, consecutively bent into U shapes in the same direction at regular intervals in advance, is bent into a rough U-shape.

Examples of use of the yarns for preventing expansion of the wire body 21 in a longitudinal direction include: a plurality of non-thermo-fusible yarns 22 which do not melt at set vulcanization temperature for vulcanizing rubber component when preparing the opening seal 10 for automobiles as shown in FIG. 9 and FIG. 10 (six non-thermo-fusible yarns in FIG. 9 and FIG. 10); and a combination of the non-thermo-fusible yarns 22 which do not melt at the set vulcanization temperature and thermo-fusible yarns 23 which do not melt at the time of an extrusion molding and melt at the set vulcanization temperature as shown in FIG. 11 (two non-thermo-fusible yarns 22 and six thermo-fusible yarns 23 in FIG. 11).

Such a structure controls unnecessary expansion of the opening seal 10 for automobiles at the time of the extrusion molding and the preparation of the opening seal 10 for automobiles and improves rigidity of the installation base member 11 after molding, thereby improving assembly force of the opening seal 10 for automobiles on the flange 3.

In the opening seal 10 for automobiles prepared by extrusion molding, parts with the non-thermo-fusible yarn 22 are greatly improved in strength compared with parts without the non-thermo-fusible yarn 22. But, in the resultant opening seal 10 for automobiles having the full length including a corner part has caused problems that, on an outer peripheral side of a position 201 as an intersection of the hollow seal member 12 and a straight line 200, the hollow seal member 12 is subjected to force expanding toward an outer peripheral side whereas, on an inner peripheral side of the position 201, the hollow seal member 12 is subjected to contracting force which cause wrinkles. The straight line 200 connects the non-thermo-fusible yarn 22 (22a) embedded on a greater opening edge side on the outer-cabin side wall 11a of the installation base member 11 with the non-thermo-fusible yarn 22 (22b) embedded on a greater opening edge side on the inner-cabin side wall 11b of the installation base member 11.

The expansion and contraction of the hollow seal member 12 hamper stabilization of the assembled state of the opening seal 10 for automobiles, which degrades external appearance and sealing function. Such problems are remarkable when the folding wrinkles 202 generate.

As shown in FIG. 11, the Japanese unexamined Patent Publication No. H03-82519 discloses to connect each of three sides of the wire core 20, respectively embedded in the outer-cabin side wall 11a, an inner-cabin side wall 11b and a connecting wall 11c of the installation base member 11, with the yarns which are thermally degraded at the set vulcanization temperature and the yarns which are not thermally degraded (non-thermo-fusible yarn) at the set vulcanization temperature. The resultant opening seal is excellent in strength toward pulling force at the time of extrusion molding. But a way of disposing the yarns on each of the three sides of the wire core 20 is rough, only one side of the wire core 20 with the non-thermo-fusible yarn for example. Such a structure does not decrease expanding or contracting state on the hollow seal member 12 sufficiently, especially while the opening seal 10 for automobiles is assembled on the corner part.

The Japanese unexamined Patent Publication No. 2004-322768 discloses to provide high melting point yarn (non-thermo-fusible yarn) on a part of the inner-cabin side wall 11b, that is at least close to the connecting wall 11c. But the invention relates to weather strips installed on automobile bodies with curves which are swelled toward width direction of the automobiles. Accordingly, the invention does not decrease expanding or contracting state on the hollow seal member 12 sufficiently while the opening seal 10 for automobiles is assembled on the corner part.

Therefore, an object of the present invention is to provide the opening seal for automobiles and method of preparing the same capable of remarkably decreasing the expanding or contracting state on the hollow seal member while the opening seal for automobiles is assembled on the corner part.

SUMMARY OF THE INVENTION

In order to achieve the above-mentioned object, according to one aspect of the invention, an opening seal for automobiles is provided, comprising: a cross section roughly U-shaped installation base member (11) mounted on a flange (3) installed along a periphery of a door (2) opening part of a body (1), including an outer-cabin side wall (11a), an inner-cabin side wall (11b) and a connecting wall (11c) connecting the side walls (11a, 11b);

a hollow seal member (12) extending from an inner side position and an outer side position of said outer-cabin side wall (11a) of the installation base member (11) respectively toward an internal circumference side and an outer circumference side of a door, which is swelled and curved toward an outer-cabin side for making elastic contact with said door (2) thereby sealing an inside and an outside of the automobile;

one or a plurality of protuberance (13) installed inside the inner-cabin side wall (11b) of said installation base member (11) for making elastic contact with and holding said flange (3); and a wire core (20) embedded in a longitudinal direction of said installation base member (11) while being bent roughly in U-shape, including: a skeletal wire body (21) formed by continuously bending a wire; and non-thermo-fusible yarn which does not melt at set vulcanization temperature, is partially connected with the wire body (21) and is roughly linearly extending in a longitudinal direction while controlling expansion of the wire body (21) in a longitudinal direction; wherein said wire core (20) has at least two non-thermo-fusible yarns (22) respectively provided on the outer-cabin side and the inner-cabin side thereof;

the non-thermo-fusible yarn (221) on the outer-cabin side is provided in a range (401) from a bending start position (21c) forming a shoulder (21a) on the outer-cabin side of the wire body (21) which is bent roughly in U-shape to a position (52) determined by offsetting a point (51), on the door internal circumference side of an inner-side base (12a) of said hollow seal member (12), with respect to the wire body (21); and the non-thermo-fusible yarn (222) on the inner-cabin side is provided in a range (501) from a bending start position (21c) forming a shoulder (21b) on the inner-cabin side of the wire body (21) which is bent roughly in U-shape to a position (54) determined by offsetting a point (53), on an opening edge side on said inner-cabin side wall (11b) of a base of the protuberance (13) which is positioned on a greater opening edge part side on the inner-cabin side wall (11b) of said installation base member (11) among said one or a plurality of protuberance (13), with respect to the wire body (21).

In addition, according to an aspect of the present invention, a method of preparing an opening seal for automobiles by extrusion and vulcanization molding is provided, comprising; a cross section roughly U-shaped installation base member (11) mounted on a flange (3) installed along a periphery of a door (2) opening part of a body (1), including an outer-cabin side wall (11a), an inner-cabin side wall (11b) and a connecting wall (11c) connecting the side walls (11a, 11b);

a hollow seal member (12) extending from an inner side position and an outer side position of said outer-cabin side wall (11a) of the installation base member (11) respectively toward an internal circumference side and an outer circumference side of a door, which is swelled and curved toward an outer-cabin side for making elastic contact with said door (2) thereby sealing an inside and an outside of the automobile;

one or a plurality of protuberance (13) installed inside the inner-cabin side wall (11b) of said installation base member (11) for making elastic contact with and holding said flange (3); and a wire core (20) embedded in a longitudinal direction of said installation base member (11) while being bent roughly in U-shape, including; a skeletal wire body (21) formed by continuously bending a wire; and non-thermo-fusible yarn which does not melt at set vulcanization temperature, is partially connected with the wire body (21) and is roughly linearly extending in a longitudinal direction while controlling expansion of the wire body (21) in a longitudinal direction; wherein said wire core (20) has at least two non-thermo-fusible yarns (22) respectively provided on the outer-cabin side and the inner-cabin side thereof;

the non-thermo-fusible yarn (221) on the outer-cabin side is provided in a range (401) from a bending start position (21c) forming a shoulder (21a) on the outer-cabin side of the wire body (21) which is bent roughly in U-shape to a position (52) determined by offsetting a point (51), on the door internal circumference side of an inner-side base (12a) of said hollow seal member (12), with respect to the wire body (21); and the non-thermo-fusible yarn (222) on the inner-cabin side is provided in a range (501) from a bending start position (21e) forming a shoulder (21b) on the inner-cabin side of the wire body (21) which is bent roughly in U-shape to a position (54) determined by offsetting a point (53), on an opening edge side on said inner-cabin side wall (11b) of a base of the protuberance (13) which is positioned on a greater opening edge part side on the inner-cabin side wall (11b) of said installation base member (11) among said one or a plurality of protuberance (13), with respect to the wire body (12).

In addition, according to an aspect of the present invention, said non-thermo-fusible yarn (221) on the outer-cabin side is provided in a range (402) from a bending end position (21d) forming a shoulder (21a) on the outer-cabin side of the wire body (21) which is bent roughly in U-shape to a position (52) determined by offsetting a point (51), on the door internal circumference side of an inner-side base (12a) of said hollow seal member (12), with respect to the wire body (21).

In addition, according to an aspect of the present invention, said non-thermo-fusible yarn (222) on the inner-cabin side is provided in a range (502) from a position (55) on the inner-cabin side determined by offsetting a providing point of said non-thermo-fusible yarn (221) on the outer-cabin side with respect to the wire body (21) to a position (54) determined by offsetting a point (53), on an opening edge side on said inner-cabin side wall (11b) of a base of the protuberance (13) that is positioned on the greater opening edge part side on the inner-cabin side wall (11b) of said installation base member (11) among said one or a plurality of protuberance, with respect to the wire body (21).

In addition, according to an aspect of the present invention, said non-thermo-fusible yarn (222) on the inner-cabin side is provided in a range (503) from a position (57), where a straight line (100) connecting an end (56) on the door internal circumference side on a hollow side of said hollow seal member (12) and the providing point of said non-thermo-fusible yarn (221) on the outer-cabin side intersects the inner-cabin side of the wire body (21), to the position (54) determined by offsetting the point (53), on the opening edge side on said inner-cabin side wall (11b) of the base of the protuberance (13) that is positioned on the greater opening edge part side on the inner-cabin side wall (11b) of said installation base member (11) among said one or a plurality of protuberance, with respect to the wire body (21).

In addition, according to an aspect of the present invention, said non-thermo-fusible yarn (222) on the inner-cabin side is provided in a range (504) from a position (59), where a straight line (300) connecting an end (58) on the door internal circumference side of said hollow seal member (12) and the providing point of said non-thermo-fusible yarn (221) on the outer-cabin side intersects the inner-cabin side of the wire body (21), to the position (54) determined by offsetting the point (53), on the opening edge side on said inner-cabin side wall (11b) of the base of the protuberance (13) that is positioned on the greater opening edge part side on the inner-cabin side wall (11b) of said installation base member (11) among said one or a plurality of protuberance, with respect to the wire body (21).

In addition, according to an aspect of the present invention, said wire body (21) is partially connected with thermo-fusible yarn (23) as well as said non-thermo-fusible yarn (22), which melts at set vulcanization temperature and roughly linearly extends in a longitudinal direction; and said thermo-fusible yarn (23) is provided: on the connecting wall (11c) of said installation base member (11); on the outer-cabin side wall (11a) of said installation base member (11), that is the opening edge side of said outer-cabin side wall (11a) compared with the providing point of the non-thermo-fusible yarn (221) on the outer-cabin side; and on the inner-cabin side wall (11b) of said installation base member (11), that is the opening edge side of said inner-cabin side wall (11b) compared with the providing point of the non-thermo-fusible yarn (222) on the inner-cabin side.

In addition, according to an aspect of the present invention, the shoulder (21a) on the outer-cabin side of said installation base member (11) is provided with coating material (31) having higher specific gravity compared with material forming said installation base member (11).

Symbols in parentheses show constituents or items corresponding to Figures and DESCRIPTION OF PREFERRED EMBODIMENT.

With the opening seal for automobiles and the method of preparing the same of the present invention, the installation base member mounted on the flange installed along the periphery of the door opening part of the body has the wire core embedded therein, including the skeletal wire body connected with the non-thermo-fusible yarn which does not melt at set vulcanization temperature. Accordingly, in a course of vulcanization and extrusion molding the opening seal for automobiles, the non-thermo-fusible yarn remains, not melts. Such a structure controls unnecessary expansion of the opening seal for automobiles together with the wire core for the effect of the non-thermo-fusible yarns even in case the wire core is pulled with strong force while extrusion molding the opening seal for automobiles in the course of preparation. Also, the structure improves assembly force of the opening seal for automobiles on the flange by improving the rigidity of the installation base member after molding.

In addition, the wire core has at least two non-thermo-fusible yarns respectively provided on the outer-cabin side and the inner-cabin side thereof; the non-thermo-fusible yarn on the outer-cabin side is provided in the range from the bending start position forming the shoulder on the outer-cabin side of the wire body which is bent roughly in U-shape to the position determined by offsetting the point, on the door internal circumference side of an inner-side base of the hollow seal member, with respect to the wire body; and the non-thermo-fusible yarn on the inner-cabin side is provided in the range from the bending start position forming the shoulder on the inner-cabin side of the wire body which is bent roughly in U-shape to the position determined by offsetting the point, on the opening edge side on said inner-cabin side wall of a base of the protuberance which is positioned on the greater opening edge part side on the inner-cabin side wall of the installation base member, with respect to the wire body. The straight line which connects the position of the non-thermo-fusible yarn on the outer-cabin side and the position of the non-thermo-fusible yarn on the inner-cabin side leans toward the internal circumference side from the outer circumference side of a door (toward the connecting wall side from an opening part side of the installation base member) when the door is closed as faced toward the outer-cabin side from the inner-cabin side for the effect of the non-thermo-fusible yarn on the outer-cabin side thus provided.

The leaned straight line as extended intersects the hollow seal member on a position on the internal circumference side of a door (on the connecting wall side from the opening part side of the installation base member) compared with the prior art (FIG. 9) in which the leaned straight line as extended intersects hollow seal member on a position on the outer circumference side. Accordingly, contracting force functions within a smaller domain of the hollow seal member when the opening seal for automobiles is assembled on a corner part on the body side of the automobile, thereby preventing generation of folding wrinkles.

Further, by leaning the straight line which connects the position of the non-thermo-fusible yarn on the outer-cabin side and the position of the non-thermo-fusible yarn on the inner-cabin side, fastening force of the installation base member on the flange from the inner-cabin side wall side is increased, which enables the protuberance provided on the inner-cabin side wall side to hold the flange sufficiently.

Such a structure enables stable assembly of the opening seal for automobiles on the corner part on the body side of the automobile and keeps the opening seal stably assembled after the assembly.

In addition, according to the present invention, the non-thermo-fusible yarn on the outer-cabin side is provided from the bending end position, not bending start position forming the shoulder on the outer-cabin side of the wire body which is bent roughly in U-shape. Accordingly, the non-thermo-fusible yarn on the outer-cabin side is provided on the outer-cabin side wall side of the installation base member, changed from the connecting wall side. Such a structure improves balance when connecting the wire body and effectively controls unnecessary expansion of the opening seal for automobiles together with the wire core while the opening seal for automobiles together with the non-thermo-fusible yarn on the inner-cabin side is extrusion molded.

In addition, according to the present invention, the non-thermo-fusible yarn on the inner-cabin side is provided in a further limited range: from the position on the inner-cabin side, determined by offsetting the providing point of the non-thermo-fusible yarn on the outer-cabin side with respect to the wire body; from the position where the straight line connecting the end on the door internal circumference side on the hollow side of the hollow seal member and the providing point of the non-thermo-fusible yarn on the outer-cabin side intersects the inner-cabin side of the wire body; or from the position where the straight line connecting the end on the door internal circumference side of the hollow seal member and the providing point of the non-thermo-fusible yarn on the outer-cabin side intersects the inner-cabin side of the wire body. The leaned straight line as extended intersects the hollow seal member on a position on the internal circumference side of the door, changed from the outer circumference side, that is on the connecting wall side changed from the opening part side of the installation base member. Accordingly, the contracting force functions within a further smaller domain of the hollow seal member when the opening seal for automobiles is assembled on the corner part on the body side, thereby preventing generation of folding wrinkles.

Also, the fastening force of the installation base member on the flange from the inner-cabin side wall side is increased, which enables the protuberance provided on the inner-cabin side wall side to hold the flange sufficiently.

It is to be noted that the position on the opening edge side of the inner-cabin side wall of each range (501, 502, 503, 504 according to the following embodiment) is determined by offsetting the point, on the opening edge side on the inner-cabin side wall of the base of the protuberance that is positioned on the greater opening edge part side on the inner-cabin side wall of the installation base member among the one or plurality of protuberance, with respect to the wire body. In case the position on the opening edge side is further on the opening edge side compared with the above-mentioned position, the opening seal for automobiles in itself may lean when assembled on the corner part on the automobile body side, which is not a desired assembled state and not favorable.

In case the non-thermo-fusible yarn on the inner-cabin side is provided in the range from the position where the straight line connecting the end on the door internal circumference side of the hollow seal member and the providing point of the non-thermo-fusible yarn on the outer-cabin side intersects the inner-cabin side of the wire body to the position determined by offsetting the point on the opening edge side on the inner-cabin side wall of the base of the protuberance that is positioned on the greater opening edge part side on the inner-cabin side wall of the installation base member among the one or plurality of protuberance with respect to the wire body, the straight line which connects the position of the non-thermo-fusible yarn on the outer-cabin side and the position of the non-thermo-fusible yarn on the inner-cabin side, as extended, intersects the hollow seal member on the position which is the end on the door internal circumference side of the hollow seal member or further door internal circumference side. Accordingly, the contracting force does not function on the hollow seal member when the opening seal for automobiles is assembled on the corner part on the body side of the automobile.

In case the non-thermo-fusible yarn on the inner-cabin side is provided on the position on which the straight line connecting the end on the door internal circumference side on the hollow side of the hollow seal member and the providing point of the non-thermo-fusible yarn on the outer-cabin side intersects the inner-cabin side of the wire body, the straight line which connects the position of non-thermo-fusible yarn on the outer-cabin side and the position of the non-thermo-fusible yarn on the inner-cabin side, as extended, intersects the hollow seal member on the position which is the end on the door internal circumference side on the hollow side of the hollow seal member when the door is closed. Accordingly, the contracting force functions only on thickness of the hollow seal member when the opening seal for automobiles is assembled on the corner part on the body side of the automobile so that the folding wrinkles hardly generates. In case the non-thermo-fusible yarn on the inner-cabin side is shifted from the position where the straight line connecting the end on the door internal circumference side on the hollow side of the hollow seal member and the providing point of the non-thermo-fusible yarn on the outer-cabin side intersects the inner-cabin side of the wire body to a position determined by offsetting the point on the opening edge side on the inner-cabin side wall of the base of the protuberance that is positioned on the greater opening edge part side on the inner-cabin side wall of the installation base member among the one or the plurality of protuberance with respect to the wire body, the straight line which connects the position of the non-thermo-fusible yarn on the outer-cabin side and the position of the non-thermo-fusible yarn on the inner-cabin side, as extended, intersects the hollow seal member on the position which is further door internal circumference side compared with the end on the door internal circumference side on the hollow side of the hollow seal member when the door is closed. Accordingly, generation of the folding wrinkles is further prevented.

In addition, according to the present invention, the wire body is partially connected with thermo-fusible yarn as well as the non-thermo-fusible yarn, which melts at set vulcanization temperature and roughly linearly extends in the longitudinal direction. Accordingly, the wire body is resistant to the pulling force before vulcanization. Also, the thermo-fusible yarn is provided on the connecting wall of the installation base member, on the outer-cabin side wall of the installation base member that is the opening edge side of the outer-cabin side wall compared with the providing point of the non-thermo-fusible yarn on the outer-cabin side and on the inner-cabin side wall of the installation base member that is the opening edge side of the inner-cabin side wall compared with the providing point of the non-thermo-fusible yarn on the inner-cabin side. Accordingly, the opening seal for automobiles is well-balanced and the thermo-fusible yarn that vanishes for the vulcanization does not cause expansion and contraction of the hollow seal member when the opening seal for automobiles is assembled on the corner part on the automobile body side.

In addition, according to the present invention, the shoulder on the outer-cabin side of the installation base member is provided with coating material having higher specific gravity compared with material forming the installation base member. Accordingly, the opening seal for automobiles is stably assembled on the corner part on the automobile body side and wrinkles do not generate on a part provided with the coating material. The non-thermo-fusible yarn on the inner-cabin side may be changed to the thermo-fusible yarn depending on strength of the material on the part.

DESCRIPTION OF PREFERRED EMBODIMENT

Figure 1:
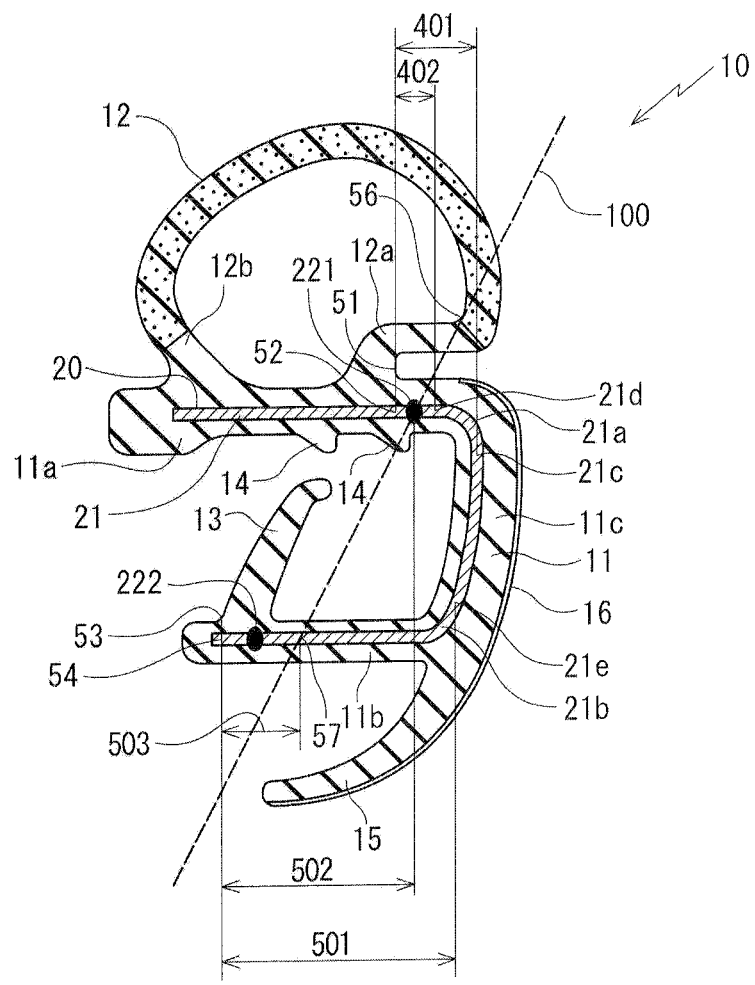
FIG. 1 is a cross section showing an opening seal for automobiles according to an embodiment of the present invention.

Referring to FIG. 1 and FIG. 2, an opening seal 10 for automobiles according to an embodiment of the present invention will be described. FIG. 1 is a cross section showing an opening seal 10 for automobiles according to an embodiment of the present invention and FIG. 2 shows a cross section of a wire core 20 shown in FIG. 1. When constituents or items correspond to those in prior arts, the same symbols are used.

The opening seal 10 for automobiles according to the embodiment of the present invention mainly comprises: an installation base member 11; a hollow seal member 12; a protuberance 13; and a wire core 20.

Figure 8:
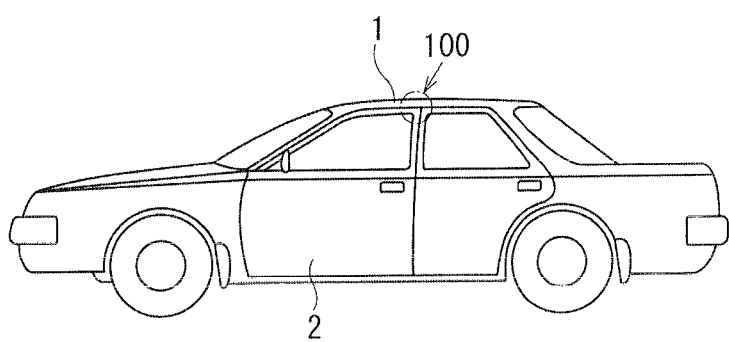
FIG. 8 is an external side view of an automobile.
Figure 9:
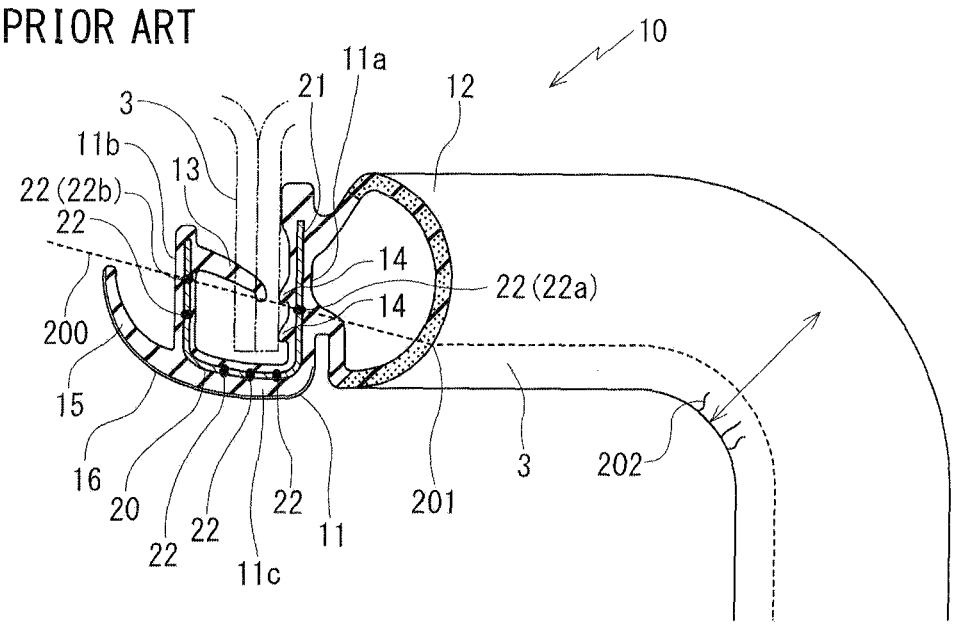
FIG. 9 is an enlarged perspective view of partial cross section of 100 in FIG. 8, showing a state that an opening seal for automobiles according to a prior art is mounted.
Figure 10A:
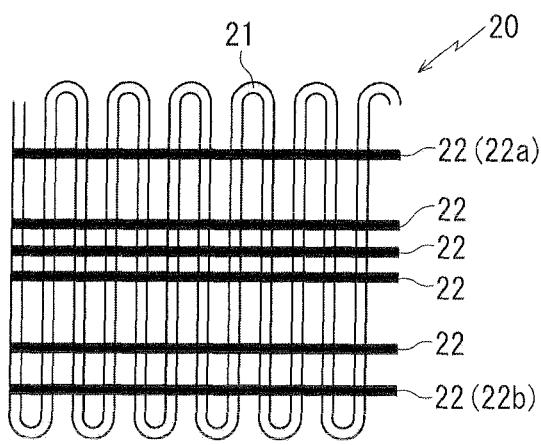
FIG. 10 show a state before a wire core embedded in the opening seal for automobiles of FIG. 9 is bent, of which (a) is a plan view and (b) is a cross section.
Figure 10B:
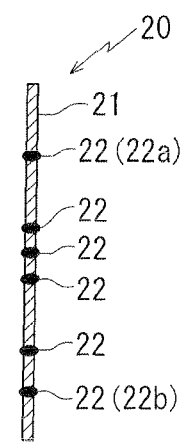
Figure 11A:
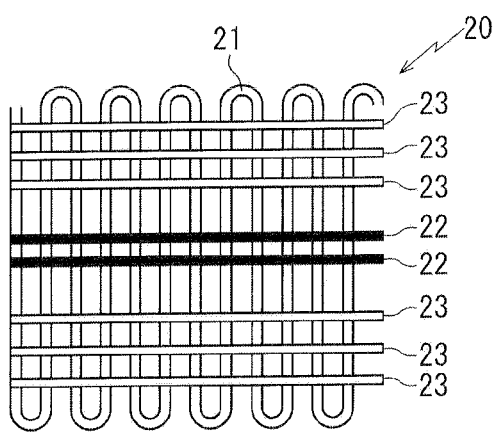
FIG. 11 show a state before another wire core embedded in the opening seal for automobiles of FIG. 9 is bent, of which (a) is a plan view and (b) is a cross section.
Figure 11B:
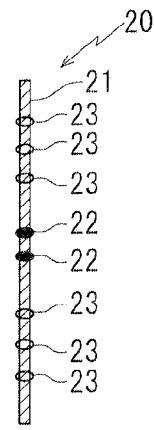

The installation base member 11 is cross section roughly U-shaped, including an outer-cabin side wall 11a, an inner-cabin side wall 11b and a connecting wall 11c connecting the side walls 11a, 11b. In the same manner as FIG. 8 and FIG. 9, the installation base member 11 is installed on a flange 3 installed along a periphery of a door 2 opening part of a body 1 in such a manner that the flange 3 is inserted into the installation base member 11 from an opening part side. The flange 3 extends inward along the periphery of the door 2 opening part.

Bases 12a, 12b of the hollow seal member 12 extend from an inner side position and an outer side position of the outer-cabin side wall 11a of the installation base member 11 respectively toward an internal circumference side and an outer circumference side of a door, which is swelled and curved toward an outer-cabin side. The hollow seal member 12 makes elastic contact with the door 2 and seals an inside and an outside of the automobile when the door 2 is closed.

The protuberance 13 extends from an inside (outer-cabin side) of the inner-cabin side wall 11b of the installation base member 11 toward the connecting wall 11c side. The protuberance 13, together with the a plurality of (two in the present embodiment) projections 14 provided inside the outer-cabin side wall 11a of the installation base member 11, makes elastic contact with and holds the flange 3 by clasping. The installation base member 11 has a lip 15 provided on an inner-cabin side thereof. Decorative coating material 16 is provided from the lip 15 to a surface of the connecting wall 11c of the installation base member 11 for decorating appearance from an inner-cabin side.

Figure 2A:
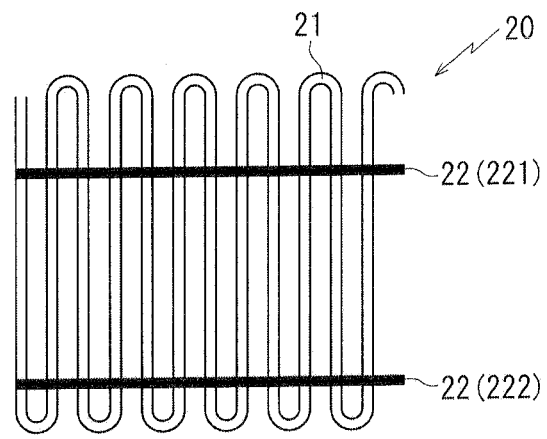
FIG. 2 show a wire core shown in FIG. 1, of which (a) is a plan view showing a state before the wire core is bent and (b) is a cross section showing a state after the wire core is bent.
Figure 2B:
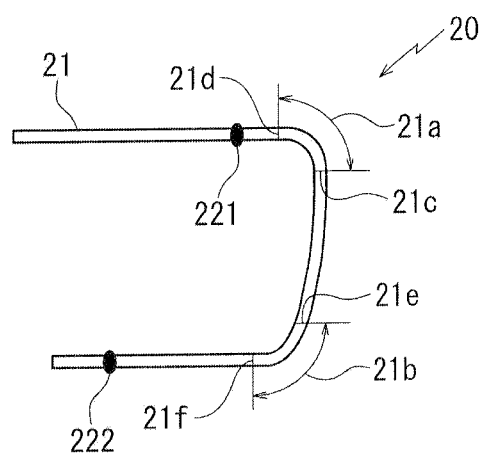

As shown in FIG. 2(a), a wire core 20 comprises: a skeletal wire body 21 formed by consecutively bending a wire; and yarn 22 partially connected with the wire body 21 for preventing expansion of the wire body 21 in a longitudinal direction. As shown in FIG. 2(b), the wire core 20 is finally embedded in a longitudinal direction of the installation base member 11 while the wire core 20, consecutively bent in U shapes in the same direction at regular intervals in advance, is bent into a rough U-shape by bending a shoulder 21a on the outer-cabin side and a shoulder 21b on the inner-cabin side. 21c is a bending start position forming the shoulder 21a on the outer-cabin side and 21d is a bending end position forming the shoulder 21a on the outer-cabin side. In the same manner, 21e is a bending start position forming a shoulder 21b on the inner-cabin side and 21f is a bending end position forming a shoulder 21b on the inner-cabin side.

Yarn 22 for controlling expansion of the wire body 21 in a longitudinal direction is non-thermo-fusible yarn which does not melt at set vulcanization temperature for vulcanizing rubber component in the course of preparing the opening seal 10 for automobiles. Two non-thermo-fusible yarns 221, 222 are provided respectively on an outer-cabin side and an inner-cabin side.

Positions for providing the non-thermo-fusible yarn 221 on the outer-cabin side and the non-thermo-fusible yarn 222 on the inner-cabin side are defined as follows.

As shown in FIG. 1, the non-thermo-fusible yarn 221 on the outer-cabin side is provided, while the wire body 21 bent roughly in U-shape is embedded in the installation base member 11, in a range 401 from the bending start position 21c forming the shoulder 21a on the outer-cabin side of the wire body 21 which is bent roughly in U-shape to a position 52 determined by offsetting a point 51 on the door internal circumference side of the inner-side base 12a of the hollow seal member 12 with respect to the wire body 21. In case the non-thermo-fusible yarn 221 is positioned on the shoulder 21a on the outer-cabin side, the non-thermo-fusible yarn 221 is subjected to shift when bending the wire body 21 as shown in FIG. 2(b) from a developed state shown in FIG. 2(a). Therefore, it is preferable not to position the non-thermo-fusible yarn 221 on the shoulder 21a on the outer-cabin side. Accordingly, the non-thermo-fusible yarn 221 on the outer-cabin side may also be provided in a range 402 from the bending end position 21d forming the shoulder 21a on the outer-cabin side of the wire body 21 which is bent roughly in U-shape to the position 52 determined by offsetting the point 51 on the door internal circumference side of the inner-side base 12a of the hollow seal member 12 with respect to the wire body 21.

In case the non-thermo-fusible yarn 221 on the outer-cabin side is provided from the bending end position 21d, not the bending start position 21c forming the shoulder 21a on the outer-cabin side of the wire body 21 which is bent roughly in U-shape, the non-thermo-fusible yarn 221 on the outer-cabin side is provided on the outer-cabin side wall 11a side of the installation base member 11, changed from the connecting wall 11c side. Such a structure improves balance when connecting the wire body 21 and effectively controls unnecessary expansion of the opening seal 10 for automobiles together with the wire core 20 while the opening seal 10 for automobiles as well as the non-thermo-fusible yarn 222 on the inner-cabin side is extrusion molded.

As shown in FIG. 1, the non-thermo-fusible yarn 222 on the inner-cabin side is provided, while the wire body 21 bent roughly in U-shape is embedded in the installation base member 11, in a range 501 from the bending start position 21e forming the shoulder 21b on the inner-cabin side of the wire body 21 which is bent roughly in U-shape to a position 54 determined by offsetting a point 53 on an opening edge side on the inner-cabin side wall 11b of a base of the protuberance 13 which is positioned on a greater opening edge part side on the inner-cabin side wall 11b of the installation base member 11, the protuberance 13 in the present embodiment because only one protuberance is provided, with respect to the wire body 21. In case the non-thermo-fusible yarn 222 is positioned on the shoulder 21b on the inner-cabin side, the non-thermo-fusible yarn 222 is subjected to shift when bending the wire body 21 as shown in FIG. 2(b) from the developed state shown in FIG. 2(a). Therefore, it is preferable not to position the non-thermo-fusible yarn 222 on the shoulder 21b on the inner-cabin side. Accordingly, the non-thermo-fusible yarn 222 on the inner-cabin side may also be provided in a range from the bending end position 21f forming the shoulder 21b on the inner-cabin side of the wire body 21 which is bent roughly in U-shape to the position 54 determined by offsetting the point 53 on the opening edge side on the inner-cabin side wall 11b of the base of the protuberance 13 with respect to the wire body 21.

In case the non-thermo-fusible yarn 222 on the inner-cabin side is provided from the bending end position 21f, not bending start position 21e, forming the shoulder 21b on the inner-cabin side of the wire body 21 which is bent roughly in U-shape, the non-thermo-fusible yarn 222 on the inner-cabin side is provided on the inner-cabin side wall 11b side of the installation base member 11, changed from the connecting wall 11c side. Such a structure improves balance when connecting the wire body 21 and effectively controls unnecessary expansion of the opening seal 10 for automobiles together with the wire core 20 while the opening seal 10 for automobiles as well as the non-thermo-fusible yarn 221 on the outer-cabin side is extrusion molded.

The non-thermo-fusible yarn 222 on the inner-cabin side may be provided in a range 502, which is limited by narrowing the range 501, from a position 55 on the inner-cabin side, determined by offsetting the providing point of the non-thermo-fusible yarn 221 on the outer-cabin side with respect to the wire body 21, to a position 54 determined by offsetting the point 53 on the opening edge side on the inner-cabin side wall 11b of the base of the protuberance 13 with respect to the wire body 21.

The non-thermo-fusible yarn 222 on the inner-cabin side may be provided in a range 503, which is limited by narrowing the range 502, from a position 57 where a straight line 100 connecting an end 56 on the door internal circumference side (door internal circumference side end part) on a hollow side of the hollow seal member 12 and the providing point of the non-thermo-fusible yarn 221 on the outer-cabin side intersects the inner-cabin side of the wire body 21 to the position 54 determined by offsetting the point 53 on the opening edge side on the inner-cabin side wall 11b of the base of the protuberance 13 with respect to the wire body 21.

Figure 3:
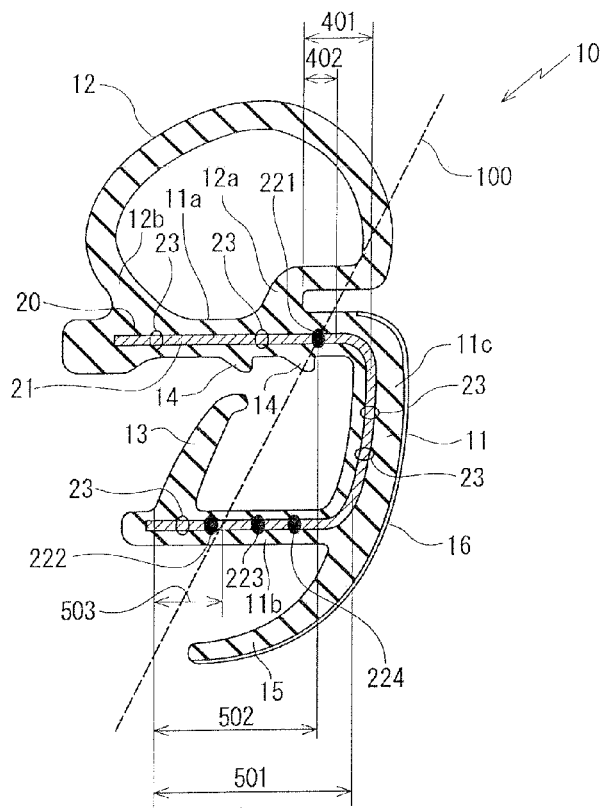
FIG. 3 is a cross section showing an opening seal for automobiles according to another embodiment of the present invention.

As shown in FIG. 3, in addition to the non-thermo-fusible yarn 221 on the outer-cabin side and the non-thermo-fusible yarn 222 on the inner-cabin side, the wire body 21 may be partially connected with thermo-fusible yarn 23 which melts at the set vulcanization temperature and roughly linearly extends in a longitudinal direction. In the present embodiment, five thermo-fusible yarns 23 are provided while the wire body 21 bent roughly in U-shape is embedded in the installation base member 11. Specifically, two thermo-fusible yarns 23 are provided on the connecting wall 11c side of the installation base member 11 except for the shoulders 21a, 21b; two thermo-fusible yarns 23 are provided on the outer-cabin side wall 11a of the installation base member 11, that is the opening edge side of the outer-cabin side wall 11a compared with the providing point of the non-thermo-fusible yarn 221 on the outer-cabin side; and one thermo-fusible yarn 23 is provided on the inner-cabin side wall 11b of the installation base member 11, that is the opening edge side of the inner-cabin side wall 11b compared with the providing point of the non-thermo-fusible yarn 222 on the inner-cabin side.

Also, the non-thermo-fusible yarn 22 can be further added. In FIG. 3, two non-thermo-fusible yarns 223, 224 are provided on the inner-cabin side wall 11b of the installation base member 11 that is the connecting wall 11c side compared with the providing point of the non-thermo-fusible yarn 222 on the inner-cabin side for improving strength toward pulling force.

According to the structure, in addition to the non-thermo-fusible yarn 22, the wire body 21 is partially connected with thermo-fusible yarn 23 which melts at the set vulcanization temperature and roughly linearly extends in a longitudinal direction. Therefore, the wire body 21 is resistant to strong pulling force before vulcanization. Also, the thermo-fusible yarn 23 is provided on each of the three sides of the installation base member. Accordingly, the opening seal 10 for automobiles is well-balanced and the thermo-fusible yarn 23 that vanishes for the vulcanization does not cause contraction of the hollow seal member 12 when the opening seal 10 for automobiles is assembled on the corner part on the automobile body side.

Examples of the non-thermo-fusible yarn 22 (221, 222, 223, 224) include yarns made of polyester resin (e.g. PET (polyethylene terephthalate)), and polyamide resin (e.g. 6 nylon, 6-6 nylon), of which melting point is 230° C. to 280° C. and which do not melt during the extrusion molding (around 100° C.) nor in a vulcanization furnace (200° C. to 250° C.).

Examples of the thermo-fusible yarn 23 include yarns made of polyolefin resin (e.g. PP (polypropylene), PE (polyethylene)) of which melting point is 100° C. to 160° C., which do not melt during the extrusion molding (around 100° C.) but melts in the vulcanization furnace (200° C. to 250° C.).

The opening seal 10 for automobiles is made of rubber material including EPDM but may also be made of other rubber materials. Also, a sealing surface side of the hollow seal member 12 is made of sponge material (e.g. EPDM sponge) whereas other parts of the of the hollow seal member 12 are made of solid material (e.g. EPDM solid) but the materials are not especially limited.

Figure 4:
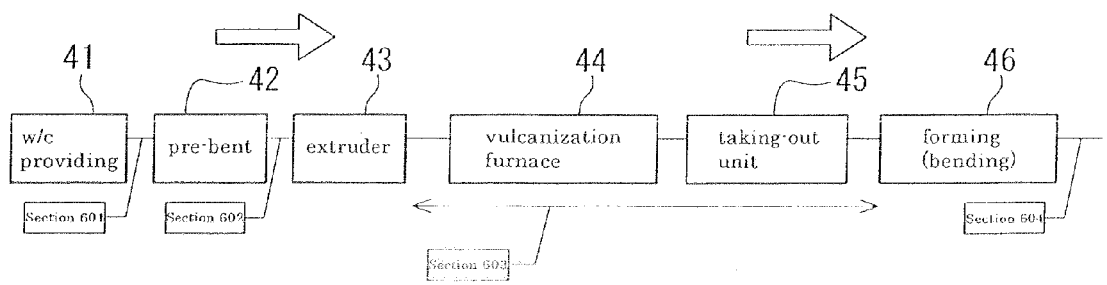
FIG. 4 is a block diagram showing a process of preparing the opening seal for automobiles of FIG. 3.

Referring to FIG. 4 and FIG. 5, an example of method of preparing the opening seal 10 for automobiles shown in FIG. 3 is explained.

Figure 5A:
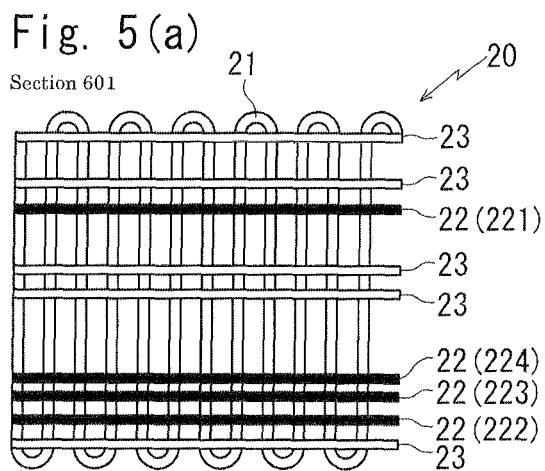
FIG. 5 show each state of the opening seal for automobiles in each section of FIG. 4, of which (a) are a plan view and a cross section of the wire core in Section 601, (b) is a cross section of the wire core in Section 602, (c) is a cross section of the opening seal for automobiles in Section 603 and (d) is a cross section of the opening seal for automobiles in Section 604.

In a wire carrier (w/c) providing process, a wire core 20 in a developed state as shown in FIG. 5(a) is sent out from a wire carrier (w/c) providing apparatus 41. The wire body 21 of the wire core 20 is partially connected with four non-thermo-fusible yarns (221, 222, 223, 224) and five thermo-fusible yarns 23 in a longitudinal direction.

As mentioned above and shown in FIG. 3 and FIG. 5(d), the non-thermo-fusible yarns 221 are provided in advance, while the wire body 21 bent roughly in U-shape is embedded in the installation base member 11 (state of a resultant product), in the range 401 from the bending start position 21c forming the shoulder 21a on the outer-cabin side of the wire body 21 which is bent roughly in U-shape to a position 52 determined by offsetting a point 51 on the door internal circumference side of the inner-side base 12a of the hollow seal member 12 with respect to the wire body 21, avoiding the shoulder 21a on the outer-cabin side.

In addition, as mentioned above and shown in FIG. 3 and FIG. 5(d), the non-thermo-fusible yarns 222 are provided in advance, while the wire body 21 bent roughly in U-shape is embedded in the installation base member 11, in the range 501 from the bending start position 21e forming the shoulder 21b on the inner-cabin side of the wire body 21 which is bent roughly in U-shape to the position 54 determined by offsetting the point 53 on the opening edge side on the inner-cabin side wall 11b of the base of the protuberance 13 with respect to the wire body 21, avoiding the shoulder 21b on the inner-cabin side.

In addition, as mentioned above and shown in FIG. 3 and FIG. 5(d), five thermo-fusible yarns 23 are provided in advance, while the wire body 21 bent roughly in U-shape is embedded in the installation base member 11. Specifically, two thermo-fusible yarns 23 are provided on the connecting wall 11c side of the installation base member 11 except for shoulders 21a, 21b; two thermo-fusible yarns 23 are provided on the outer-cabin side wall 11a of the installation base member 11, that is the opening edge side of the outer-cabin side wall 11a compared with the providing point of the non-thermo-fusible yarn 221 on the outer-cabin side; and one thermo-fusible yarn 23 is provided on the inner-cabin side wall 11b of the installation base member 11, that is the opening edge side of the inner-cabin side wall 11b compared with the providing point of the non-thermo-fusible yarn 222 on the inner-cabin side.

In addition, as mentioned above and shown in FIG. 3 and FIG. 5(d), the non-thermo-fusible yarns 223, 224 are provided in advance, while the wire body 21 bent roughly in U-shape is embedded in the installation base member 11, on the inner-cabin side wall 11b of the installation base member 11 that is the connecting wall 11c side compared with the providing point of the non-thermo-fusible yarn 222 on the inner-cabin side.

Figure 5B:
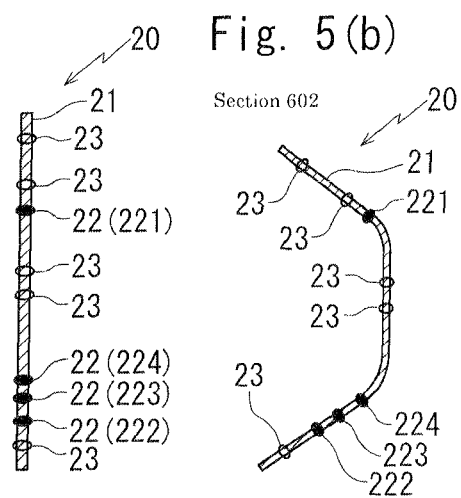

Next, in a pre-bent process, the wire core 20 in the developed state is bent into a dish shape in cross section by bending both edge sides thereof in a pre-bent apparatus 42 as shown in FIG. 5(b). Also, only one edge side (one of the two edge sides) of the wire core 20 may be bent, not both edge sides.

Figure 5C:
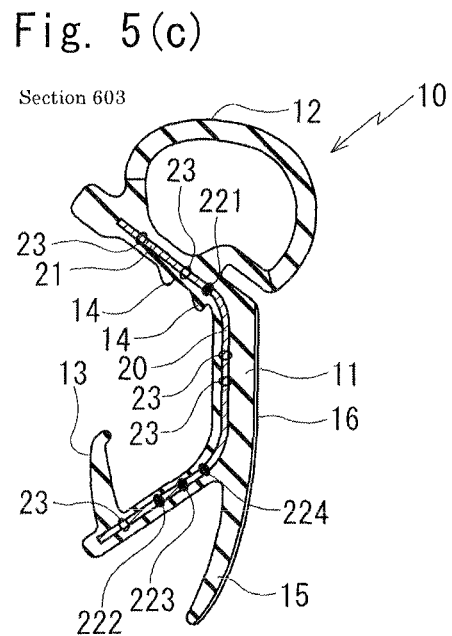

Next, in an extrusion process, an extruder 43 forms the installation base member 11 into a dish shape by further widening an opening of the installation base member 11 as shown in FIG. 5(c) compared with the rough U-shape in cross section (the opening is widened by around 45 degrees respectively to the left and right compared with the rough U-shape in cross section) along the shape of the wire core 20 that is pre-bent into the dish shape in cross section and embedded in the installation base member 11. Then, in the extrusion process, the extruder 43 extrudes the opening seal 10 for automobiles into a vulcanization furnace 44. In the extrusion process, the hollow seal member 12, the protuberance 13, the projections 14, the lip 15 and the coating material 16 are integrally extrusion molded with the installation base member 11.

The vulcanization furnace 44 has a taking-out unit 45 on an exit side thereof for guiding the wire core 20 extruded from the extruder 43 together with the opening seal 10 for automobiles to the vulcanization furnace 44 with strong force.

In the vulcanization process, the opening seal 10 for automobiles is heat treated at 200° C. to 250° C. inside the vulcanization furnace 44, which vulcanizes the rubber component and assures stable elasticity and strength. While the thermo-fusible yarn 23 vanishes when passing through the vulcanization furnace 44, four non-thermo-fusible yarns 221, 222, 223, 224 do not melt even after passing through the vulcanization furnace 44. Therefore, the opening seal 10 for automobiles is not expanded in the vulcanization process.

Figure 5D:
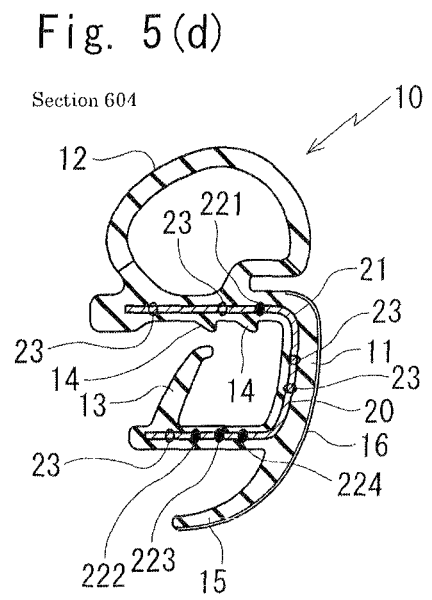

In a forming machine 46, the vulcanized opening seal 10 for automobiles passes through a sizing die for narrowing the opening of the installation base member 11 to be the rough U-shape in cross section as shown in FIG. 5(d).

Finally, after cooling treatment or the like, resultant opening seal 10 for automobiles is prepared.

According to the above-structured opening seal 10 for automobiles, the installation base member 11 mounted on the flange 3 installed along the periphery of the door opening part of the body 1 has the wire core 20 embedded therein, including the skeletal wire body 21 connected with the non-thermo-fusible yarns 22 (221, 222, 223, 224) which do not melt at the set vulcanization temperature. Accordingly, while vulcanizing and extrusion molding the opening seal 10 for automobiles, the non-thermo-fusible yarns 22 remain without melting. Such a structure controls unnecessary expansion of the opening seal 10 for automobiles together with the wire core 20 for the effect of the non-thermo-fusible yarns 22 even in case the wire core 20 is pulled with strong force while extrusion molding the opening seal 10 for automobiles in the course of preparation. Also, the structure improves assembly force of the opening seal 10 for automobiles on the flange 3 by improving the rigidity of the installation base member 11 after molding.

In addition, at least two non-thermo-fusible yarns 22 are provided respectively on the outer-cabin side and the inner-cabin side. The non-thermo-fusible yarn 221 on the outer-cabin side is provided in the range 401 from the bending start position 21c forming the shoulder 21a on the outer-cabin side of the wire body 21 which is bent roughly in U-shape to the position 52 determined by offsetting a point 51 on the door internal circumference side of the inner-side base 12a of the hollow seal member 12 with respect to the wire body 21. The non-thermo-fusible yarn 222 on the inner-cabin side is provided in the range 501 from the bending start position 21e forming the shoulder 21b on the inner-cabin side of the wire body 21 which is bent roughly in U-shape to the position 54 determined by offsetting a point 53 on the opening edge side on the inner-cabin side wall 11b of the base of the protuberance 13. Accordingly, the straight line which connects the position of the non-thermo-fusible yarn 222 on the inner-cabin side and the position of the non-thermo-fusible yarn 221 on the outer-cabin side leans toward the internal circumference side of the door 2 from the outer circumference side (toward the connecting wall 11c side from the opening part side of the installation base member 11) as faced toward the outer-cabin side from the inner-cabin side.

The leaned straight line as extended intersects the hollow seal member 12 on the position on the internal circumference side of the door 2 compared with the prior art (FIG. 9) in which the leaned straight line as extended intersects hollow seal member 12 on the position on the outer circumference side (on the connecting wall 11c side from the opening part side of the installation base member 11). Accordingly, contracting force functions within the smaller domain of the hollow seal member 12 when the opening seal for automobiles is assembled on the corner part on the body side, thereby preventing generation of the folding wrinkles 202.

Further, by leaning the straight line which connects the position of the non-thermo-fusible yarn 221 on the outer-cabin side and the position of the non-thermo-fusible yarn 222 on the inner-cabin side, fastening force of the installation base member 11 on the flange 3 from the inner-cabin side wall 11b side is increased, which enables the protuberance 13 provided on the inner-cabin side wall 11b side to hold the flange 3 sufficiently.

Such a structure enables stable assembly of the opening seal 10 for automobiles on the corner part on the body side of the automobile and keeps the opening seal 10 for automobiles stably assembled even after the assembly.

By gradually limiting the range for providing the non-thermo-fusible yarn 222 on the inner-cabin side from the range 501 to 502, 503, the leaned straight line as extended, which connects the position of the non-thermo-fusible yarn 221 on the outer-cabin side and the position of the non-thermo-fusible yarn 222 on the inner-cabin side, intersects the hollow seal member 12 on the position further on the internal circumference side of the door 2, shifted from the outer circumference side (on the connecting wall 11c side shifted from the opening part side of the installation base member 11). Accordingly, the contracting force functions within the smaller domain of the hollow seal member 12 when the opening seal 10 for automobiles is assembled on the corner part on the body side of the automobile, thereby preventing generation of folding wrinkles 202.

Also, the fastening force of the installation base member 11 on the flange 3 from the inner-cabin side wall 11b side is increased, which enables the protuberance 13 provided on the inner-cabin side wall 11b side to hold the flange 3 sufficiently.

In case the non-thermo-fusible yarn 222 on the inner-cabin side is provided on the position 57 within the range 503, on which the straight line 100 connecting the position of the end 56 on the door internal circumference side on the hollow side of the hollow seal member 12 and the providing point of the non-thermo-fusible yarn 221 on the outer-cabin side intersects the inner-cabin side of the wire body 21, the straight line which connects the position of the non-thermo-fusible yarn 221 on the outer-cabin side and the position of the non-thermo-fusible yarn 222 on the inner-cabin side, as extended, intersects the hollow seal member 12 on the position which is the end 56 on the door internal circumference side on the hollow side of the hollow seal member 12. Accordingly, the contracting force functions only on thickness of the hollow seal member 12 when the opening seal 10 for automobiles is assembled on the corner part on the body side of the automobile so that the folding wrinkles 202 hardly generates. In case the non-thermo-fusible yarn 222 on the inner-cabin side is shifted from the position 57 where the straight line 100 intersects the inner-cabin side of the wire body 21 to the position 54 determined by offsetting the point 53 on the opening edge side on the inner-cabin side wall 11b of the base of the protuberance 13 with respect to the wire body 21, the straight line which connects the position of the non-thermo-fusible yarn 221 on the outer-cabin side and the position of the non-thermo-fusible yarn 222 on the inner-cabin side, as extended, intersects the hollow seal member 12 on the position, that is further on the door internal circumference side compared with the end 56 on the door internal circumference side. Accordingly, generation of the folding wrinkles is further prevented.

Figure 6:
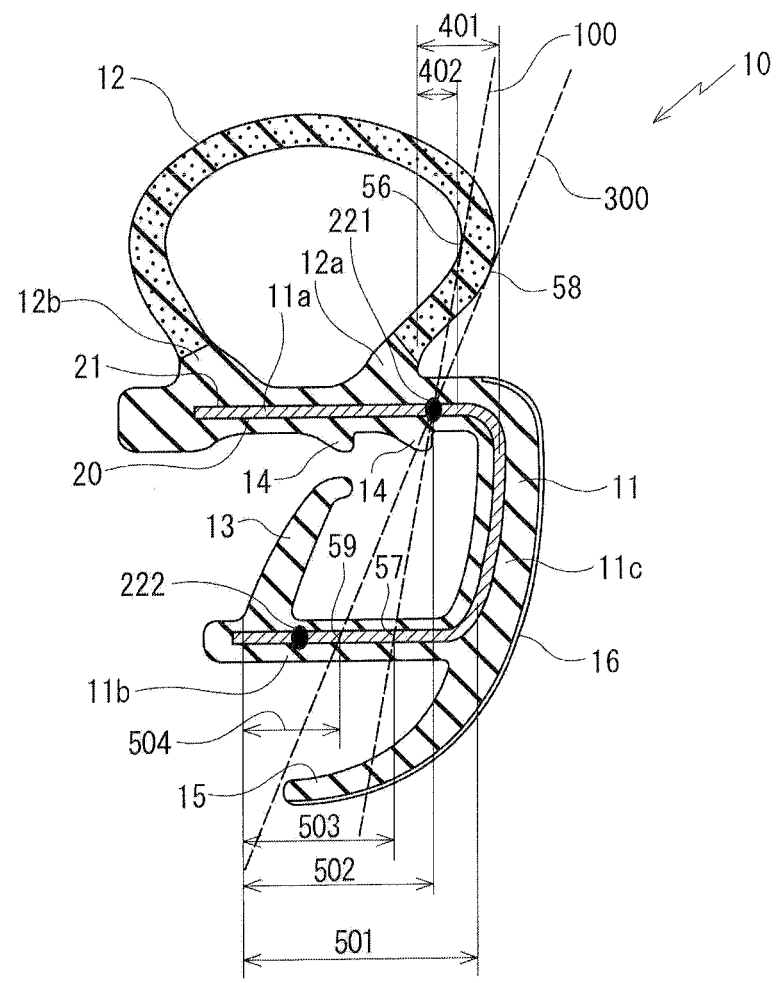
FIG. 6 is a cross section showing an opening seal for automobiles according to still another embodiment of the present invention.

In the present embodiment, the base 12a of the hollow seal member 12, which extends from an inner side position of the outer-cabin side wall 11a of the installation base member 11, is laid toward the internal circumference side of the door 2 compared with the base 12b of the hollow seal member 12, which extends from an outer side position of the outer-cabin side wall 11a. But, as shown in FIG. 6, the inner-side base 12a of the hollow seal member 12 may project from the outer-cabin side wall 11a of the installation base member 11 at the same angle as the base 12b on the outer side, thereby extending in a rough V-shape in cross section.

In the present embodiment, the non-thermo-fusible yarn 222 on the inner-cabin side is provided in the range 503 from the position 57 where the straight line 100 connecting the end 56 on the door internal circumference side (door internal circumference side end part) on the hollow side of the hollow seal member 12 and the providing point of the non-thermo-fusible yarn 221 on the outer-cabin side intersects the inner-cabin side of the wire body 21 to the position 54 determined by offsetting the point 53 on the opening edge side on the inner-cabin side wall 11b of the base of the protuberance 13 with respect to the wire body 21. But the range 503 may be limited by narrowing. Specifically, as shown in FIG. 6, non-thermo-fusible yarn 222 on the inner-cabin side may be provided in the range 504 from the position 59 where the straight line 300 connecting the end 58 on the door internal circumference side (door internal circumference side end part) of the hollow seal member 12 and the providing point of the non-thermo-fusible yarn 221 on the outer-cabin side intersects the inner-cabin side of the wire body 21 to the position 54 determined by offsetting the point 53 on the opening edge side on the inner-cabin side wall 11b of the base of the protuberance 13 with respect to the wire body 21.

According to the structure, the straight line which connects the position of the non-thermo-fusible yarn 221 on the outer-cabin side and the position of the non-thermo-fusible yarn 222 on the inner-cabin side, as extended, intersects the hollow seal member 12 on the position which is the end on the door internal circumference side of the hollow seal member 12 or further door internal circumference side. Accordingly, the contracting force does not function on the hollow seal member 12 when the opening seal 10 for automobiles is assembled on the corner part on the body side of the automobile.

Figure 7:
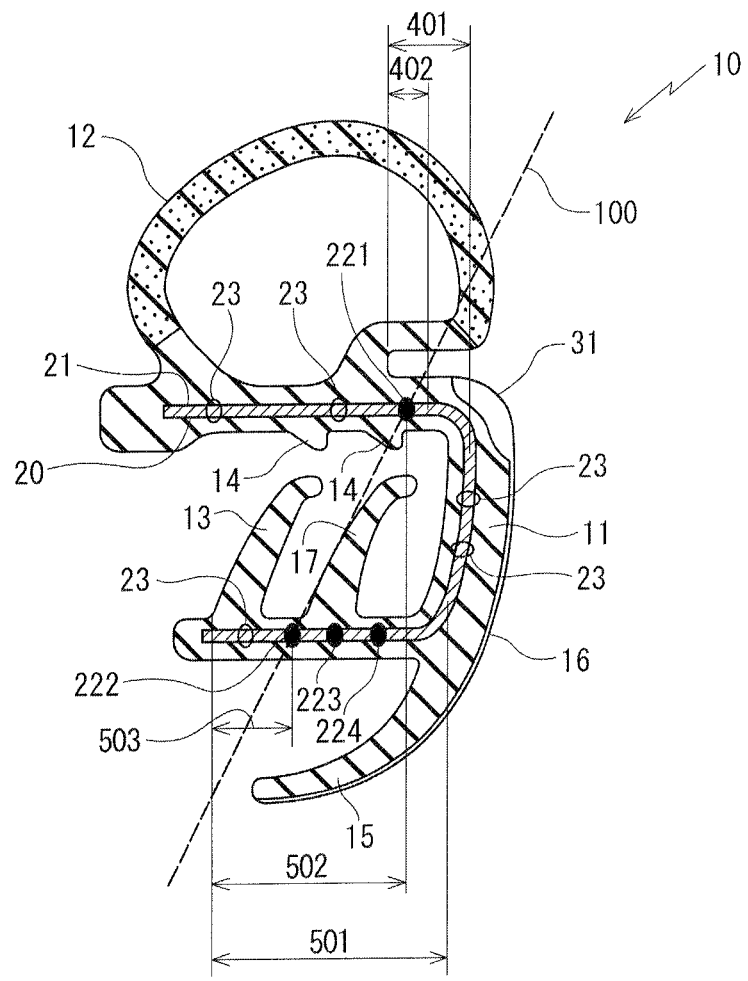
FIG. 7 is a cross section showing an opening seal for automobiles according to still another embodiment of the present invention.

In the present embodiment, one protuberance 13 is provided inside the inner-cabin side wall 11b of the installation base member 11. But, as shown in FIG. 7, a plurality of the protuberances 13, 17 (two protuberances in FIG. 7) may be provided. In this case, a limitation point for providing the non-thermo-fusible yarn 222 on the inner-cabin side on the opening edge side of the inner-cabin side wall 11b is the position 54 determined by offsetting the point 53, on the opening edge side on the inner-cabin side wall 11b of the base of the protuberance 13 as a benchmark among the plurality of the protuberances 13, 17 positioned on the greater opening edge part side on the inner-cabin side wall 11b of the installation base member 11, with respect to the wire body 21.

Also, as shown in FIG. 7, the shoulder 21a on the outer-cabin side of the installation base member 11 is provided with coating material 31 having higher specific gravity (e.g. specific gravity of 0.9 to 1.3) compared with material forming the installation base member 11 over a wider range compared with the coating material 16. Accordingly, the opening seal 10 for automobiles is stably assembled on the on the corner part of a periphery of the door 2 opening part of the body 1 and wrinkles do not generate on the part provided with the coating material 31. The non-thermo-fusible yarn 221 on the inner-cabin side may be changed to the thermo-fusible yarn depending on strength of the material forming the part.

We claim:

1. An opening seal for automobiles, comprising: a cross section roughly U-shaped installation base member mounted on a flange including a corner part on a body side, the flange being installed along a periphery of a door opening part of a body, the installation base member including an outer-cabin side wall, an inner-cabin side wall and a connecting wall connecting the side walls;

a hollow seal member extending from an inner side position and an outer side position of said outer-cabin side wall of the installation base member respectively toward an internal circumference side and an outer circumference side of a door, which is swelled and curved toward an outer-cabin side for making elastic contact with said door thereby sealing an inside and an outside of the automobile;

one or a plurality of protuberance installed inside the inner-cabin side wall of said installation base member for making elastic contact with and holding said flange; and a wire core embedded in a longitudinal direction of said installation base member while being bent roughly in U-shape, including: a skeletal wire body formed by continuously bending a wire; and non-thermo-fusible yarn which does not melt at set vulcanization temperature, is partially connected with the wire body and is roughly linearly extending in a longitudinal direction while controlling expansion of the wire body in a longitudinal direction; wherein:

said wire core has at least two non-thermo-fusible yarns respectively provided on the outer-cabin side and the inner-cabin side thereof;

the non-thermo-fusible yarn on the outer-cabin side is provided in a range from a bending start position forming a shoulder on the outer-cabin side of the wire body which is bent roughly in U-shape to a position determined by offsetting a point on the door internal circumference side of an inner-side base of said hollow seal member with respect to the wire body;

the non-thermo-fusible yarn on the inner-cabin side is provided in a range from a bending start position forming a shoulder on the inner-cabin side of the wire body which is bent roughly in U-shape to a position determined by offsetting a point on an opening edge side on said inner-cabin side wall of a base of the protuberance which is positioned on a greater opening edge part side on the inner-cabin side wall of said installation base member among said one or a plurality of protuberance with respect to the wire body; and a straight line which connects a position of the non-thermo-fusible yarn which is closest to an opening edge of the wire body on the outer-cabin side and a position of the non-thermo-fusible yarn which is closest to an opening edge of the wire body on the inner-cabin side leans toward the internal circumference side from the outer circumference side of the door when viewed from the inside of the automobile.

2. The opening seal for automobiles as claimed in claim 1, wherein: said non-thermo-fusible yarn on the outer-cabin side is provided in a range from a bending end position forming a shoulder on the outer-cabin side of the wire body which is bent roughly in U-shape to a position determined by offsetting a point on the door internal circumference side of an inner-side base of said hollow seal member with respect to the wire body.

3. The opening seal for automobiles as claimed in claim 1, wherein: said non-thermo-fusible yarn on the inner-cabin side is provided in a range from a position on the inner-cabin side determined by offsetting a providing point of said non-thermo-fusible yarn on the outer-cabin side with respect to the wire body to a position determined by offsetting a point on an opening edge side on said inner-cabin side wall of a base of the protuberance which is positioned on the greater opening edge part side on the inner-cabin side wall of said installation base member among said one or a plurality of protuberance with respect to the wire body.

4. The opening seal for automobiles as claimed in claim 2, wherein: said non-thermo-fusible yarn on the inner-cabin side is provided in a range from a position where a straight line connecting an end on the door internal circumference side on a hollow side of said hollow seal member and the providing point of said non-thermo-fusible yarn on the outer-cabin side intersects the inner-cabin side of the wire body to the position determined by offsetting the point on the opening edge side on said inner-cabin side wall of the base of the protuberance which is positioned on the greater opening edge part side on the inner-cabin side wall of said installation base member among said one or a plurality of protuberance with respect to the wire body.

5. The opening seal for automobiles as claimed in claim 2, wherein: said non-thermo-fusible yarn on the inner-cabin side is provided in a range from a position where a straight line connecting an end on the door internal circumference side of said hollow seal member and the providing point of said non-thermo-fusible yarn on the outer-cabin side intersects the inner-cabin side of the wire body to the position determined by offsetting the point on the opening edge side on said inner-cabin side wall of the base of the protuberance which is positioned on the greater opening edge part side on the inner-cabin side wall of said installation base member among said one or a plurality of protuberance with respect to the wire body.

6. The opening seal for automobiles as claimed in claim 2, wherein: said non-thermo-fusible yarn on the inner-cabin side is provided in a range from a position on the inner-cabin side determined by offsetting a providing point of said non-thermo-fusible yarn on the outer-cabin side with respect to the wire body to a position determined by offsetting a point on an opening edge side on said inner-cabin side wall of a base of the protuberance which is positioned on the greater opening edge part side on the inner-cabin side wall of said installation base member among said one or a plurality of protuberance with respect to the wire body.

7. The opening seal for automobiles as claimed in claim 1, wherein
the straight line extended intersects the hollow seal member on a position on the internal circumference side of the door transferred from the outer circumference side.

* * * * *